United States Patent Office 3,045,770
Patented July 24, 1962

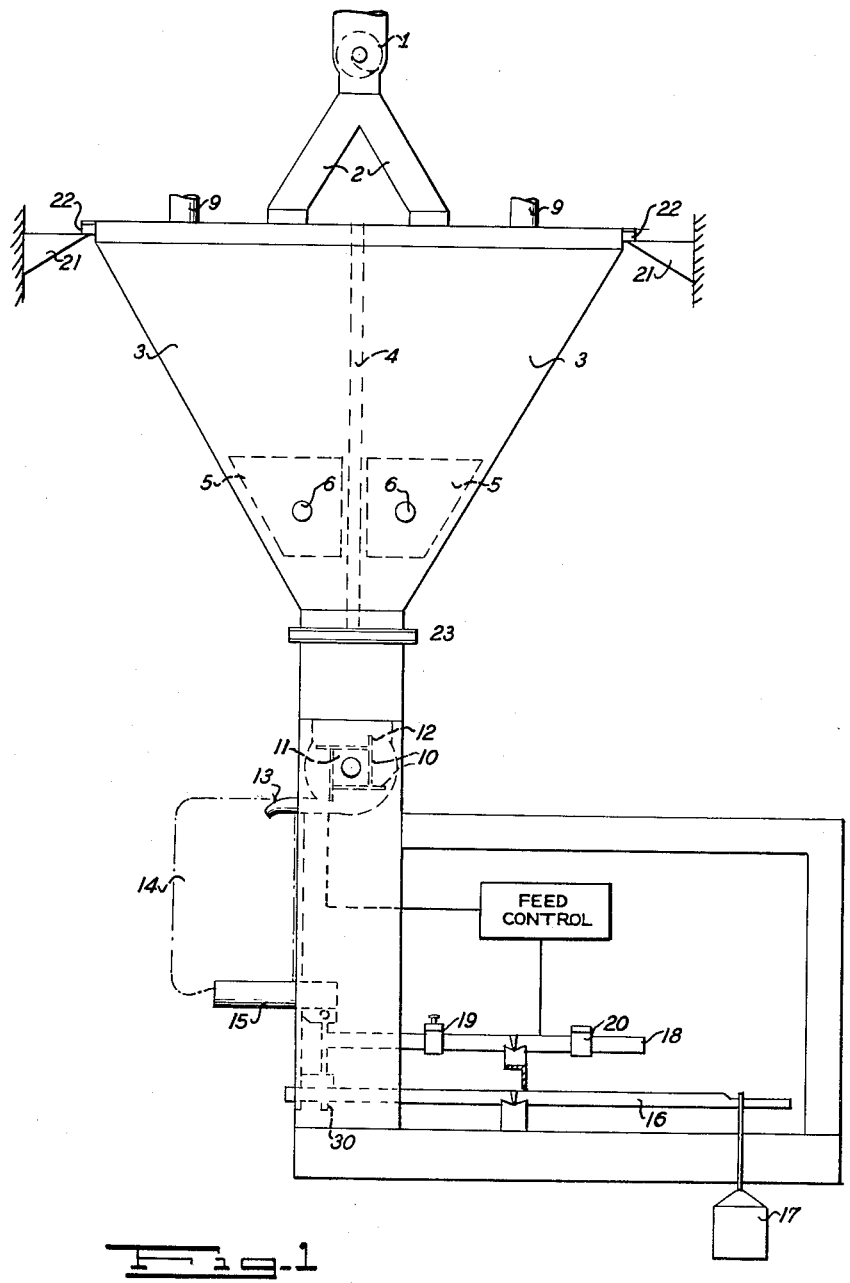

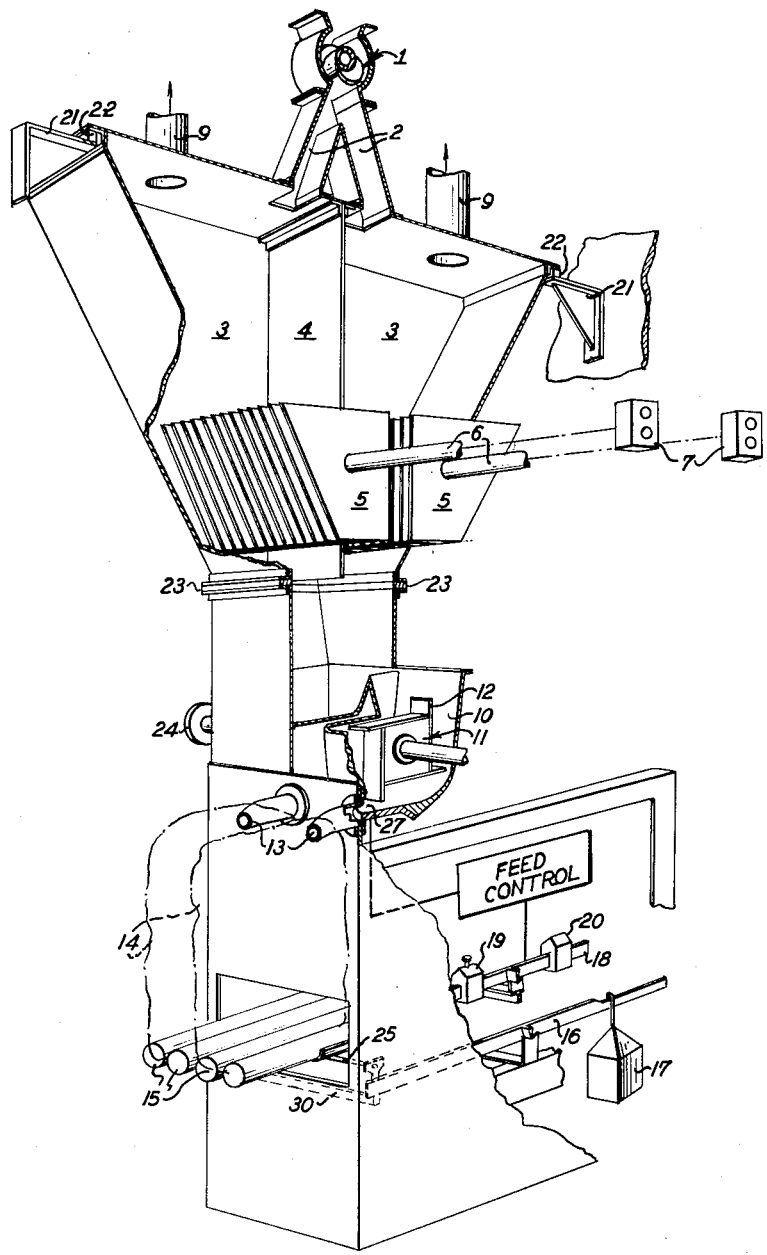

3,045,770
PACKING MACHINE FOR GRANULAR AND POWDERED MATERIALS
Fritz Haver, Oelde, Westphalia, Germany, assignor to Haver & Boecker, Oelde, Westphalia, Germany, a corporation of Germany
Filed Apr. 21, 1958, Ser. No. 729,630
1 Claim. (Cl. 177—69)

This invention relates to packing machines used for the filling of gritty and powdered materials into valve bags.

In the first place this invention relates to stationary valve bag packing machines in which the empty bag stands on a balance and filling and weighing is done in one operation.

Such packing machines consist of a silo for the reception of the material to be packed which is tapered towards the bottom and ends in a filling funnel in which a mechanical conveying or feeding device is installed which presses the filling material through a filling tube into the valve bag. The bag stands on a bag chair is fixed to the scale-beam of a balance installed underneath the silo and thus joins in the pendular movements of the scale-beam. The feed stream is at first throttled by the lowering scale-beam and completely cut off when the filling weight has been reached.

The most essential feature of the invention is that several filling points are attached to one weighing system so that several bags can be filled simultaneously and weighed mutually i.e. concurrently.

Another feature of the invention is that for the conveying or feeding device turbines known in themselves are used which in order to secure outputs of uniform quantities are of uniform dimensions and arranged on a mutual shaft driven by an electro-motor.

Another feature of the invention is that there are pre-compacting devices provided in the silo, which consist of honeycomb cells known in themselves that in the machine according to the invention execute vibrations parallel to the broadside of the packing machine and which are vibrated by means of a mutual oscillator in order to obtain a uniform effect on all points.

Due to the fact that in the packing machine according to the invention several filling points are arranged to one weighing system and several bags can be filled simultaneously and weighed mutually, the number of weighing devices or scales required is low with an important increase of the machine capacity and a considerably greater exactness of the bag weight.

In order to obtain a filling of the different bags uniform in weight, it is necessary that uniform quantities of uniform materials be filled into the different bags.

In order to secure that uniform quantities be conveyed, filling turbines known in themselves are used in the packing machine according to the invention which are equal in form, size and revolutions. The equality of revolutions is secured by attaching the filling turbines to a mutual shaft driven by a motor.

In order to secure the same weights of the same quantities, it is advisable to mix the filling material by means of pneumatic devices in such a way that a homogeneous mixture in respect to particle sizes, moisture, chemical ingredients etc. is obtained. The filling material mixed in such a way has moreover to be de-aerated before being fed to the different filling points so as to eliminate as far as possible fluctuations of the density due to entrance of air.

For the de-aeration of the filling material, the packing machine according to the invention is provided with pre-compacting honeycomb cells known in themselves which however, contrary to well known packing machines, execute vibrations parallel to the broadside of the machine and which get their impulse from one or several mutual oscillators. So all filling points are fed with a material uniformly de-aerated.

A packing machine according to the invention with 6 filling spouts is almost of the same breadth as a 3-spout machine of standard design, a packing machine with 8 filling spouts is almost as broad as a 4-spout machine of standard design.

The capacity of the packing machine according to the invention can be regarded as double of that of former systems, the number of operators being the same, namely one person.

The installation of the packing machine according to the invention in existent packing plants is possible by simple exchange of silo and packing machine whereby, as mentioned before, a doubling of the capacity will be obtained.

The packing machine according to the invention is shown in the accompanying drawings:

FIG. 1 shows a section of the side view

FIG. 2 shows a front view.

The filling material is fed by means of the screw 1 over the chutes 2 to the silo 3 which may be subdivided by a partition-wall 4. In each half of the silo there is a pre-compacting device installed consisting of many parallel plates 5 which are fixed to a one-piece shaft 6 and put into vibrations parallel to the broadside of the packing machine by means of an oscillator 7 mounted at the side. The end of the shaft 6 opposite to the oscillator is either intercepted by an elastic buffer 8 or operates together with a second oscillator. The air escaping during the pre-compacting process can be exhausted at 9 by means of a suction filter. From the silo 3 the filling material is fed to the filling turbine 10, propelled in the direction of filling by the impellor blades 12 which are fixed to the cube 11 and then pressed through the filling tube 13 into the bag 14. The resting base 15 for the bag 14, the filling tube 13, are connectively arranged for operation together. The aforesaid combination of elements is indirectly carried by means of an element 30 by the load arm of the balance 16, so that it follows the upward and downward movements of the balance 16. In the filling position the tube 13 is directly opposed to the outlet 27 of the filling funnel, as can be seen from the drawing. The material to be filled into the bags is passed into the filling tubes 13 from the filling turbine 10 through outlet 27 and from the filling tubes passes into the bag 14 positioned thereunder. As soon as the weight of the bag approaches the filling weight, the load of the balance 16 is lowered.

The double silo 3 depends from the claws 21 of a housing not shown in the drawing. In order to avoid the transmission of the vibrations of the pre-compacting device to the filling device and the housing, there are means 22 and 23 provided to damp the vibrations.

As to be seen from FIG. 2, the three single balances each have a double spout attached for the filling of the material. The pre-compacting devices of all the filling points are put into vibration by the mutual oscillator 7 and the filling turbines driven by a mutual motor over the pulley 24.

Part 10 shows one of the three double turbines. On the filling tubes 13 there are the empty bags 14 which with their bottom ends stand on the double-tube bag chairs. Both bag chairs have the mutual horizontal cross beam 25 and the vertical tie rods 26 adjustable in height to the main scale-beam 16. The weight box 17 is mounted, as to be seen from FIG. 1, at the other end of the main scale-beam.

The use and operation of the invention are as follows:

The hopper is always maintained filled with the material which is to be bagged. The operator will adjust the scale depending upon the kind of material and size of bags employed. He will then place the machine in operation. The material is fed from the hopper into the silo. The uniform mixture is thereafter subjected to a compacting treatment and after having been pre-compacted—i.e., de-aerated—is fed to the filling turbines. The turbines are of uniform dimensions and are arranged on a mutual shaft driven by an electric motor assuring that uniform quantities will be delivered in each instance.

Each single balance is provided with spouts for filling two or more bags. The scale is set for the total weight to be filled into all of the bags taken together and the filling initiated. As each turbine is attached to the identical shaft and is of identical construction, the number of revolutions being constant when the total weight for which the scale has been set is attained, the filling ceases. That is, as the bags are filled with the material, they in toto become heavier until they reach a weight equal to the counterweight on the opposite arm of the scale. The said arm is provided with means for actuating further means for interrupting the flow of material when the precisely determined quantity of material has been filled into the bags. Since all of the filling means are arranged on the same shaft and driven by the same (supra) source at the identical speed in revolutions, filling at all points is interrupted simultaneously. That is, all of the filling pipes are directly controlled by the beam on the scale to open and close uniformly so that into each bag there is conveyed the same amount of homogenized filling material. At the shut-off point, each bag will have one-half or one-fourth, etc., of the total predetermined weight.

The advantages of the machine in accordance with the invention are obvious as to the decrease in the number of scales required to fill a considerably greater number of bags—i.e., increase in machine capacity and with a considerably greater exactness of bag weight. The fact that each bag will only have a proportionate fraction of the allowed error in weighing is of great significance. This is accomplished in the manner, for example, that, if the weighing unit or scale is set for 200 pounds, two bags of 100 pounds each are filled simultaneously on each weighing unit. Because each weighing unit is allowed only a narrow limit of deviation by the weights and measures authorities, when two bags are weighed upon the one scale the advantage results in that the deviation or error, if any, is distributed evenly between two bags. In the foregoing example of a scale set for 200 pounds and having a permissible 20 ounce deviation, the two 100 pound bags will only at the maximum deviate by 10 ounces each.

This invention is not confined to valve bag packing machines, but can also be used with the same advantage for the filling of other containers.

I claim:

In an apparatus for filling bags: feeding mechanism including a spout and power-actuated means for filling a bag, a displaceable weighing device including means for supporting a bag in filling relation to said spout, said weighing device undergoing weighing displacement in response to a filling of the bag with a pre-selected weight of material, means responsive to weighing displacement of said device for arresting the filling of the bag, the improvement which comprises said weighing device being adapted to receive a number of bags simultaneously, said filling means being adapted for delivering material to said bags concurrently, and means for maintaining the rates of delivery of said delivering means at a constant proportion with respect to each other, said feeding mechanism being provided with a pre-compacting honeycomb cell for each of said bags to be filled for de-aerating the material to be filled into said bags, said honeycomb cells being arranged on a mutual shaft, and means for imparting vibrations to said honeycomb cells comprising at least one oscillator cooperating with said shaft.

References Cited in the file of this patent

UNITED STATES PATENTS

| | | |
|---|---|---|
| 936,557 | Nickerson | Oct. 12, 1909 |
| 1,561,584 | Bates | Nov. 17, 1925 |
| 2,437,172 | Peterson | Mar. 2, 1948 |
| 2,795,389 | Aust | June 11, 1957 |